United States Patent [19]

Wiesenfeldt et al.

[11] Patent Number: 5,391,719
[45] Date of Patent: Feb. 21, 1995

[54] PREPARATION OF AMINOFORMAZANS

[75] Inventors: Matthias Wiesenfeldt, Mutterstadt; Klaus Pandl, Ludwigshafen; Manfred Patsch, Wachenheim, all of Germany

[73] Assignee: BASF Aktiengesellschaft, Ludwigshafen, Germany

[21] Appl. No.: 79,926

[22] Filed: Jun. 23, 1993

[30] Foreign Application Priority Data

Jul. 1, 1992 [DE] Germany ............................ 4221543

[51] Int. Cl.⁶ ...................... C09B 50/00; C09B 50/10; C09B 62/038; C09B 62/018
[52] U.S. Cl. ...................................... 534/652; 534/618
[58] Field of Search ........................ 534/618, 652

[56] References Cited

U.S. PATENT DOCUMENTS

| | | | |
|---|---|---|---|
| 4,720,542 | 1/1988 | Omura et al. | 534/618 |
| 4,880,434 | 11/1989 | Harada et al. | 8/549 |
| 4,906,736 | 3/1990 | Schwaiger et al. | 534/618 |
| 4,935,500 | 6/1990 | Omura et al. | 534/618 |
| 5,015,731 | 5/1991 | Schwaiger et al. | 534/618 |

FOREIGN PATENT DOCUMENTS

| | | | |
|---|---|---|---|
| 0280139 | 8/1988 | European Pat. Off. | 534/618 |
| 0402318 | 12/1990 | European Pat. Off. | 534/618 |
| 0984452 | 2/1965 | United Kingdom | 534/618 |

OTHER PUBLICATIONS

Houben-Weyl "Methoden der Organischen Chemie", vol. XI/1, pp. 926 to 951, 1957.
Chem. Ber., vol. 88, pp. 895 to 899, 1955, Schmidt-Thome.

*Primary Examiner*—Floyd D. Higel
*Attorney, Agent, or Firm*—Oblon, Spivak, McClelland, Maier & Neustadt

[57] ABSTRACT

A process for preparing metal aminoformazans by alkaline hydrolysis of the corresponding acylated amino derivates in aqueous medium, is described, the hydrolysis being carried out at from 120° to 170° C. and from 3 to 5 bar in the presence of from 1.5 to 3 mol of an alkali metal hyroxide, based on 1 mol of acylated aminoformazan.

5 Claims, No Drawings

PREPARATION OF AMINOFORMAZANS

The present invention relates to a novel process for preparing metal aminoformazans by alkaline hydrolysis of the corresponding acylated amino derivatives.

According to a method disclosed in EP-A-280 139, amino-containing formazan dyes are prepared by reaction of an aryl hydrazone with a diazotized o-hydroxyaminobenzene. In order to ensure a selective reaction, however, the amino groups present in the final product must previously be provided with a protective group. An acyl group is mainly used for this purpose. After the formation of the formazan dye, this protective group must be removed again by hydrolysis. Owing to the slow removal of the acyl function in the alkaline medium, long reaction times are necessary here, which leads, in particular, to losses in yield due to formation of by-products.

In the subsequent reaction with hydrolysis-sensitive fiber-reactive compounds, e.g. with chlorotriazines, in the case of contamination with by-products increased hydrolysis of the reactive radical takes place. To avoid losses in yield, complicated purification and separation processes are therefore often necessary.

EP-A-402 318 describes a process for avoiding by-products during the hydrolysis by converting the amino function into a urethane group. This method is limited, however, owing to the relatively easy removability of the protective group during the coupling reaction.

It is an object of the present invention to provide a novel process for preparing aminoformazans that starts from acylated aminoformazans and in which the removal of the acyl protective group can be carried out rapidly and in a simple manner.

We have found that this object is achieved advantageously by the preparation of aminoformazans of the formula I

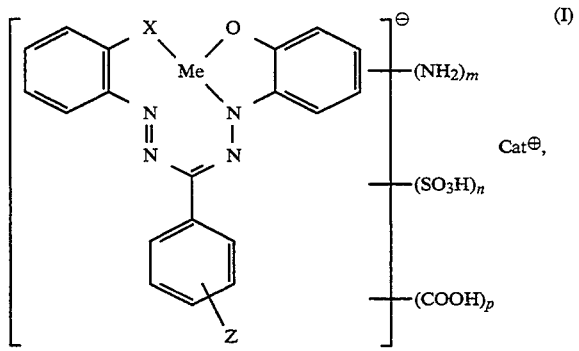

where
X is oxygen or a radical of the formula CO—O or SO$_2$—O,
Me is copper or nickel,
Z is hydrogen, halogen or hydroxyl,
Cat$^\oplus$ is the equivalent of a cation,
m is 1 or 2,
n is 1, 2, 3 or 4 and
p is 0, 1 or 2, with the proviso that the sum of n+p is 1 to 4,
by alkaline hydrolysis of acylated aminoformazans of the formula II

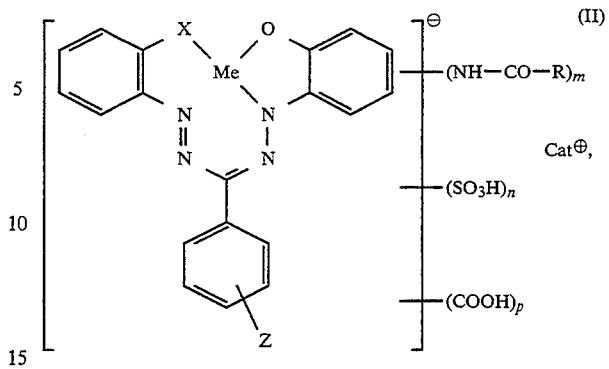

where R is hydrogen or C$_1$-C$_4$-alkyl and X, Me, Z, Cat$^\oplus$ m, n and p in each case have the abovementioned meanings, in aqueous medium if the hydrolysis is carried out from 120° to 170° C. and from 3 to 5 bar in the presence of from 1.5 to 3 mol of an alkali metal hydroxide, based on 1 mol of acylated aminoformazan of the formula II.

The preparation of formylated aminoformazans is described in the earlier German Patent Application P 42 19 421.0.

Cat$^\oplus$ is the equivalent of a cation and is derived from a proton or metal or ammonium ion. Metal ions are particularly the lithium, sodium or potassium ions. Ammonium ions are either unsubstituted or substituted ammonium cations. Substituted ammonium cations are e.g. monoalkyl-, dialkyl-, trialkyl-, tetraalkyl- or benzyltrialkylammonium cations or those cations which are derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is to be understood here in general as being straight-chain or branched C$_1$-C$_{20}$-alkyl, which can be substituted by hydroxyl groups and/or interrupted by oxygen atoms in an ether function.

Lithium, sodium or potassium ions may be mentioned in particular, sodium ions being particularly to be emphasized.

Radicals Z in formula I are e.g. fluorine, chlorine or bromine.

Suitable alkali metal hydroxides are e.g. lithium, sodium or potassium hydroxide, where the use of sodium or potassium hydroxide and in particular of sodium hydroxide is to be emphasized.

A procedure is preferred in which the hydrolysis is carried out at from 140° to 160° C.

A procedure is furthermore preferred in which the hydrolysis is carried out at from 3 to 4 bar.

A procedure is furthermore preferred in which the hydrolysis is carried out in the presence of from 2 to 3 mol of alkali metal hydroxide, based on 1 mol of acylated aminoformazan of the formula II.

A process for preparing aminoformazans of the formula I is furthermore preferred where X is the radical of the formula CO—O and Me is copper.

A process is furthermore preferred in which acylated aminoformazan of the formula II is hydrolyzed where R is hydrogen or methyl, in this case in particular methyl.

A procedure for preparing aminoformazans of the formula I is furthermore preferred where Z is hydrogen.

A procedure for preparing aminoformazans of the formula I is furthermore preferred where p is 0.

A procedure is particularly to be mentioned in which an acylated aminoformazan of the formula IIa

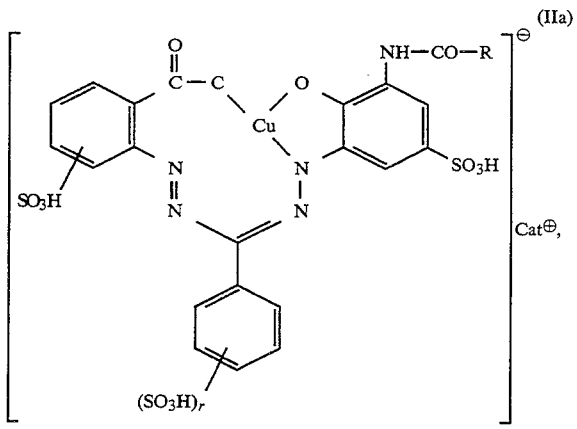

where r is 0, 1 or 2 and Cat⊕ and R in each case have the abovementioned meanings, is hydrolyzed.

The process according to the invention is carried out in aqueous medium. In this process, e.g. acylated aminoformazans of the formula II can be used, which have been intermediately isolated after their synthesis. However, it is more advantageous to use the aqueous reaction mixture obtained in the preparation of the acylated aminoformazans of the formula II directly for the hydrolysis according to the invention.

As a rule, from 3 to 10 parts by weight, preferably from 4.5 to 6.5 parts by weight, of water are present here per part by weight of acylated aminoformazan II.

The novel process is expediently carried out by adding an aqueous suspension of the acylated aminoformazan together with the alkali metal hydroxide, which customarily is used in the form of a 20 to 50% strength by weight aqueous lye, to a suitable pressure apparatus, e.g. to an autoclave, and heating at from 120° to 170° C. for from 1 to 7 hours, a pressure of 3 to 5 bar being established. After reaction is complete, the mixture is cooled to from 20° to 70° C. and the pressure in the pressure apparatus is released. The reaction mixture is then subjected to clarifying filtration and can be used directly for further reactions, e.g. for reaction with reactive groups, such as cyanuric chloride, to give reactive dyes.

Of course, the target product can also be isolated, for example by salting it out, separating it and drying it.

For reaction with the reactive group, the reaction mixture is as a rule adjusted to a pH of from 4.5 to 5.0 and then reacted in a manner known per se with the active component to give the reactive dye.

By means of the novel process, which can be carried out both continuously and batchwise, the aminoformazans of the formula I are selectively obtained in high yield and purity. As mentioned above, these products are useful intermediates for the synthesis of formazan reactive dyes and can be converted into the corresponding reactive dyes with distinctly increased space-time yield without complicated purification or separation of by-products.

The Examples illustrate the invention.

EXAMPLE 1 a) 13 g (0.05 mol) of 3-acetamido-4-hydroxybenzenesulfonic acid (eq 260) were dissolved in 100 ml of water by adding 3 ml of 50% strength by weight aqueous sodium hydroxide solution. After adding 12.5 ml of hydrochloric acid (M 100), 15 ml (0.05 mol) of aqueous sodium nitrite solution (M 300) were added dropwise from 0° to 5° C. The reaction mixture was stirred for 2 hours at from 0° to 5° C. The excess nitrite was removed by adding sulfamic acid. The reaction solution was then added dropwise at from 15° to 20° C. to a solution of 33 g (0.05 mol) of hydrazone of the formula

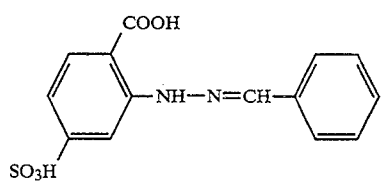

(eq 660) in 50 ml of water and 11 ml of 50% strength by weight aqueous sodium hydroxide solution and 12.5 g of copper sulfate. The suspension obtained, which contained the acetylated aminoformazan of the formula

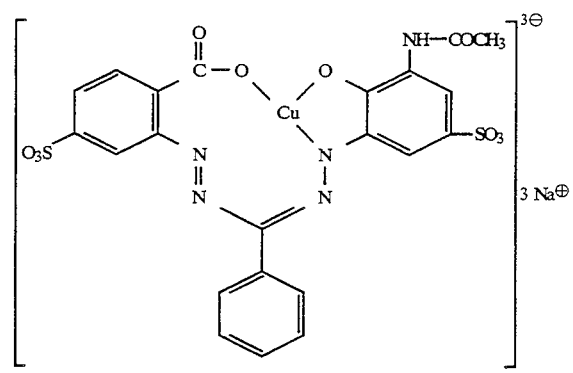

was reused in the following examples without further purification.

b) 8.3 ml (0.15 mol) of 50% strength by weight aqueous sodium hydroxide solution were added to the suspension described in Example 1a). The resulting mixture was heated at 140° C. for 3 hours in a 1 l autoclave (pressure: about 4 bar). After completion of the reaction, the autoclave was cooled to 70° C., the pressure was released and the reaction solution was subjected to clarifying filtration. 747.4 g of an aqueous solution were obtained, which contained the free amino compound of the formula

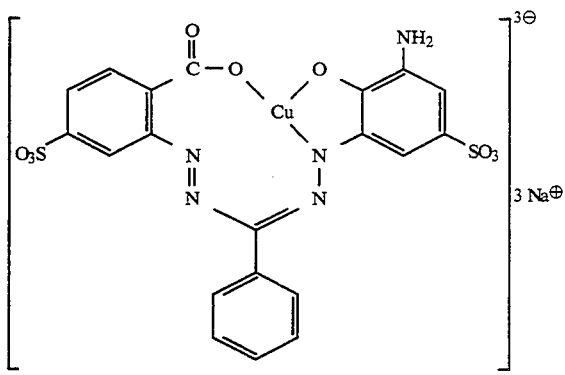

c) The solution obtained in Example 1b) was adjusted to a pH of 5 with hydrochloric acid. A solution of 7.4 g (0.04 mol) of cyanuric chloride in 85 ml of acetone was added at 5° C. to this solution. It was then warmed to 20° C. and the product was precipitated by salting out with 25 g of potassium chloride and 75 g of sodium chloride. 39.4 g of the compound of the formula

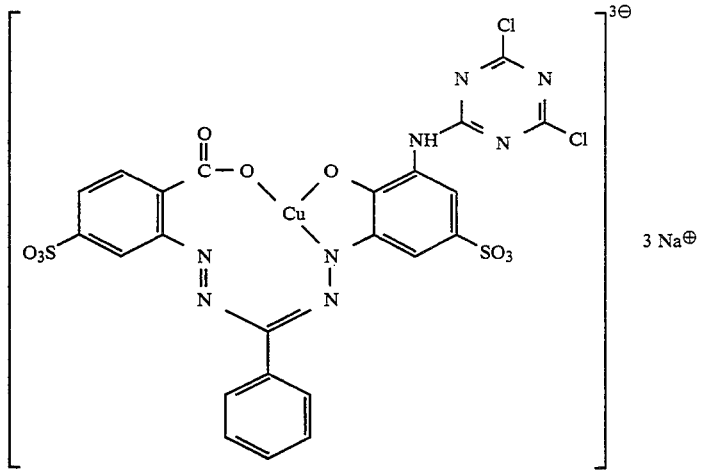

having a purity of 78% were obtained. The yield was 76% of theory.

EXAMPLE 2

8.3 ml (0.15 mol) of 50% strength by weight aqueous sodium hydroxide solution were added to the suspension prepared according to Example 1a). The resulting mixture was heated at 150° C. for 2 hours in a 1 l autoclave (pressure: about 4 bar). After completion of the reaction, the autoclave was cooled to 70° C., the pressure was released and the reaction solution was subjected to clarifying filtration. 812.6 g of dye solution were obtained. This was adjusted to a pH of 5 with hydrochloric acid. A solution of 7.4 g (0.04 mol) of cyanuric chloride with 85 ml of acetone was added to this at 5° C. The mixture was then warmed to 20° C. and the product was precipitated by salting out with 25 g of potassium chloride and 75 g of sodium chloride. After filtering off with suction and drying, 42.37 g of the dye described in Example 1c) having a purity of 79% were obtained. The yield was 83% of theory.

EXAMPLE 3 a) 52 g (0.2 mol) of 3-acetamido-4-hydroxybenzenesulfonic acid (EQ 260) were dissolved in 400 ml of water by adding 12 ml of 50% strength by weight aqueous sodium hydroxide solution. After adding 50 ml of hydrochloric acid (M 100) 60 ml (0.2 mol) of aqueous sodium nitrite solution (M 300) were added dropwise at from 0° to 5° C.

The reaction mixture was stirred for 2 hours at from 0° to 5° C. The excess nitrite was removed by adding sulfamic acid. The reaction solution was then added dropwise at from 15° to 20° C. to a solution of 132 g (0,2 mol) of the hydrazone (eq 660) mentioned in Example 1a) in 200 ml of water and 39 ml of 50% strength by weight aqueous sodium hydroxide solution and 50 g of copper sulfate. The suspension obtained, which contained the aminoformazan indicated in Example 1a), was reused in the following examples without further purification.

b) 33 ml (0.6 mol) of 50% strength by weight aqueous sodium hydroxide solution were added to the suspension prepared in Example 3a). The resulting mixture was heated at 160° C. for 1 hour in a 2 l autoclave (pressure: about 4 bar). After completion of the reaction, the autoclave was cooled to 70° C., the pressure was released and the reaction solution was subjected to clarifying filtration. 1853 g of dye solution were obtained, which contained the free amino compound indicated in Example 1b).

c) The solution obtained in Example 3c) was adjusted to a pH of 5 with hydrochloric acid. A solution of 35 g (0.19 mol) of cyanuric chloride in 90 ml of acetone was added at 5° C. to this solution. The solution was then heated to 20° C. and the product was precipitated by salting out with 100 g of potassium chloride and 300 g of sodium chloride. After filtering off with suction and drying, 157.6 g of the reactive dye described in Example 1c) having a purity of 67.6% were obtained. The yield was 66% of theory.

EXAMPLE 4

33 ml (0.6 mol) of 50% strength by weight aqueous sodium hydroxide solution were added to the suspension prepared in Example 3a). The resulting mixture was heated under a nitrogen atmosphere for 1 hour at 160° C. in a 2 l autoclave. After completion of the reaction, the autoclave was cooled to 70° C., the pressure was released and the reaction solution was subjected to clarifying filtration. 1880 g of dye solution were obtained. This was adjusted to a pH of 5 with hydrochloric acid. A solution of 35 g (0.19 mol) of cyanuric chloride in 90 ml of acetone was added at 5° C. to this solution. The solution was then warmed to 20° C. and the product was precipitated by salting out with 100 g of potassium chloride and 300 g of sodium chloride. After filtering off with suction and drying, 178,5 g of the reactive dye described in Example 1c) having a purity of 75.4% were obtained. The yield was 83% of theory.

EXAMPLE 5 a) 52 g (0.2 mol) of 3-Acetamido-4-hydroxybenzenesulfonic acid (eq 260) were dissolved in 400 ml of water by adding 12 ml of 50% strength by weight aqueous sodium hydroxide solution. After adding 50 ml of hydrochloric acid (M 100), 60 ml (0.2 mol) of aqueous sodium nitrite solution (M 300) were added dropwise at from 0° to 5° C. The reaction mixture was stirred for 2 hours at from 0° to 5° C.. The excess nitrite was removed by adding sulfamic acid. The reaction solution was then added dropwise at from 15° to 20° C. to a solution of 89.7 g (0.2 mol) of the hydrazone of the formula

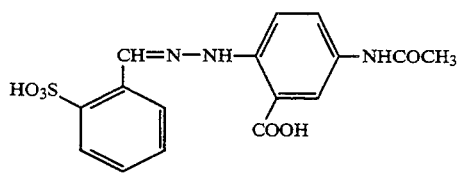

in 200 ml of water and 20 ml of 50% strength by weight aqueous sodium hydroxide solution and 50 g of copper sulfate. The pH was kept at from 6.5 to 7 during the dropwise addition by adding 30 ml of 50% strength by weight aqueous sodium hydroxide solution. The suspension obtained, which contained the aminoformazan of the formula

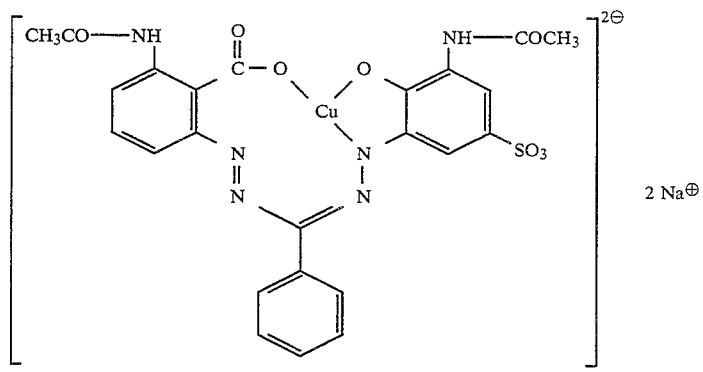

was reused in the following without further purification.

b) 66 ml (1.2 mol) of 50% strength by weight aqueous sodium hydroxide solution were added to the suspension prepared in Example 5a). The resulting mixture was heated at 160° C. in an autoclave for 1 hour (pressure: about 4 bar). After completion of the reaction, the autoclave was cooled to 70° C., the pressure was released and the reaction solution which contained the free amino compound of the formula

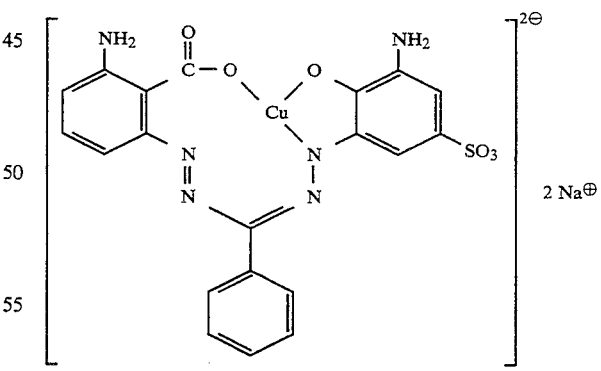

was subjected to clarifying filtration. 2040.5 g of dye solution were obtained.

c) The solution obtained in Example 5b) was adjusted to a pH of 5 with hydrochloric acid. A solution of 73.8 g (0.4 mol) of cyanuric chloride in 90 ml of acetone was added at 5° C. to this solution. The solution was then warmed to 20° C. and the product was precipitated by salting out with 100 g of potassium chloride and 300 g of sodium chloride. After filtering off with suction and drying, 310.5 g of the compound of the formula

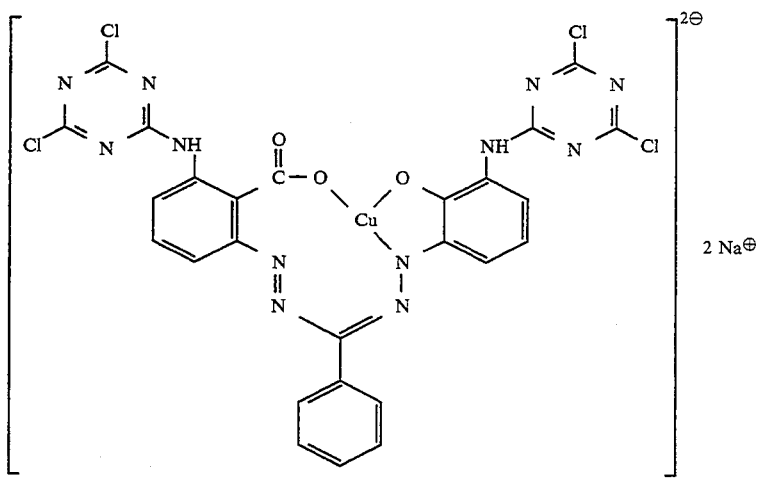
having a purity of 47.5% were obtained. The yield was 76% of theory.
The aminoformazans listed below can be obtained in an analogous manner.
| Ex. No. | |
|---|---|
| 6 | 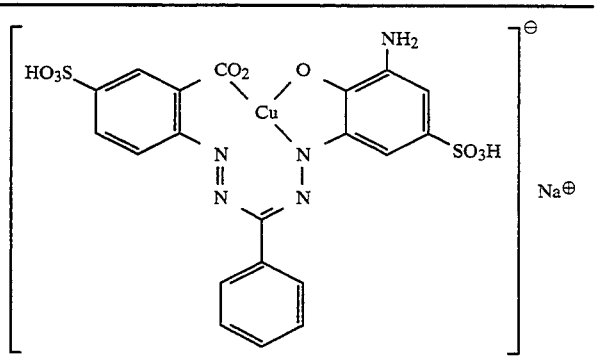 |
| 7 | 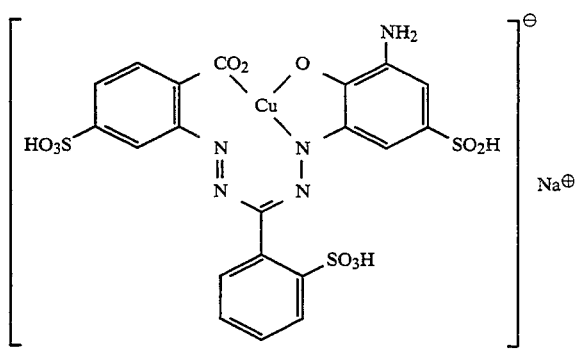 |
| 8 | 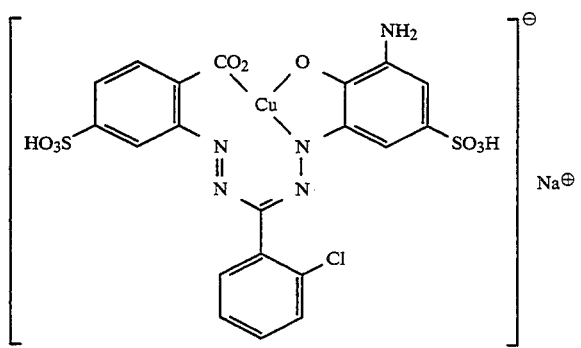 |

-continued
| Ex. No. | |
|---|---|
| 9 | 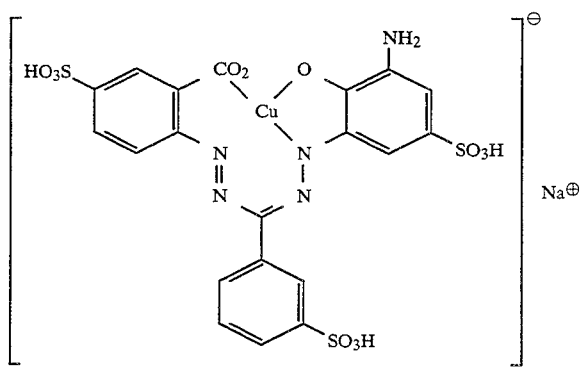 |
| 10 | 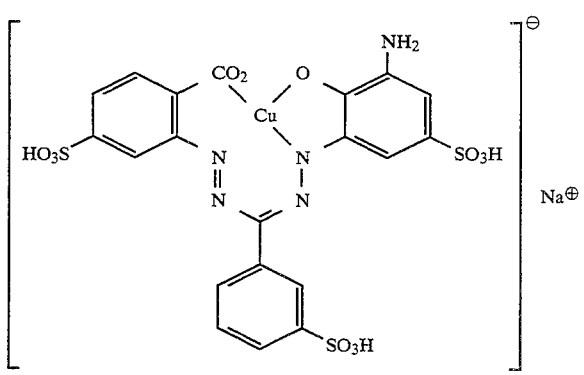 |
| 11 | 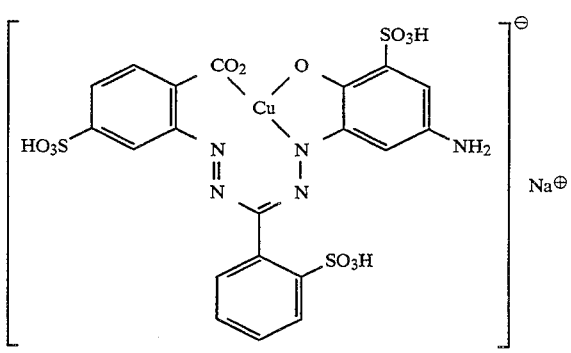 |
| 12 | 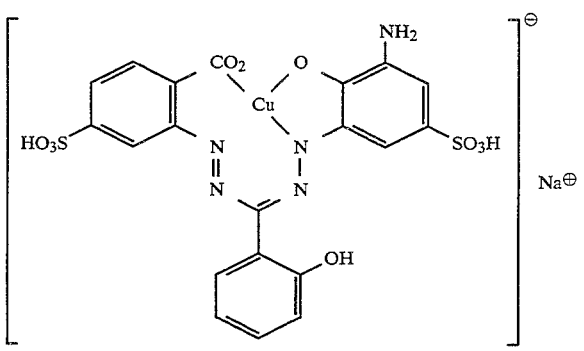 |

| Ex. No. | |
|---|---|
| 13 | 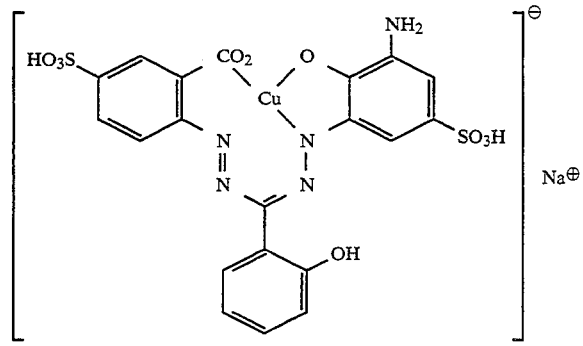 |
| 14 | 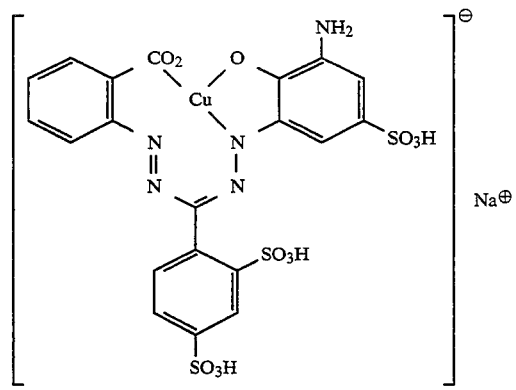 |
| 16 | 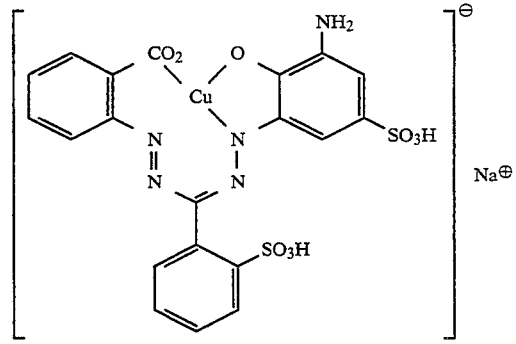 |
| 17 | 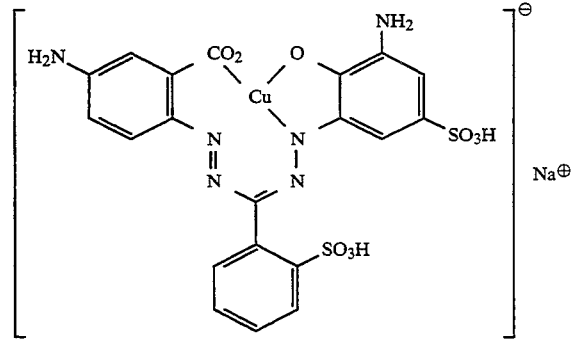 |

-continued
| Ex. No. | |
|---|---|
| 18 | 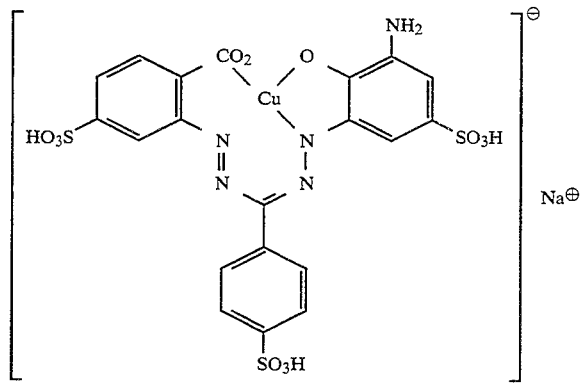 |
| 19 | 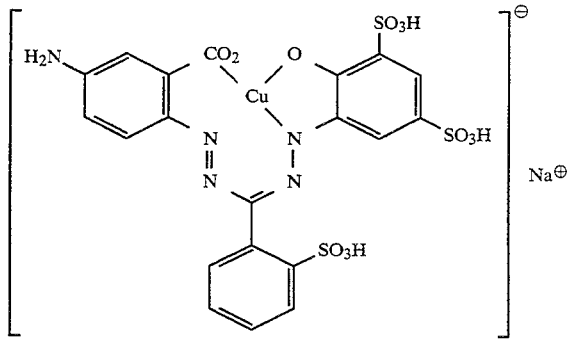 |
| 20 | 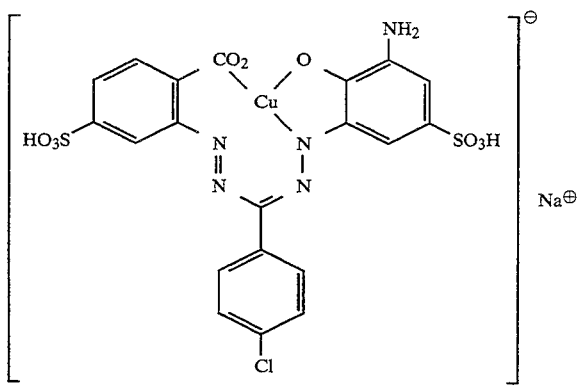 |
The reactive dyes are prepared from the abovementioned aminoformazans by reaction with cyanuric chloride, as described in the above examples.
We claim:
1. A process for preparing aminoformazans of the formula I
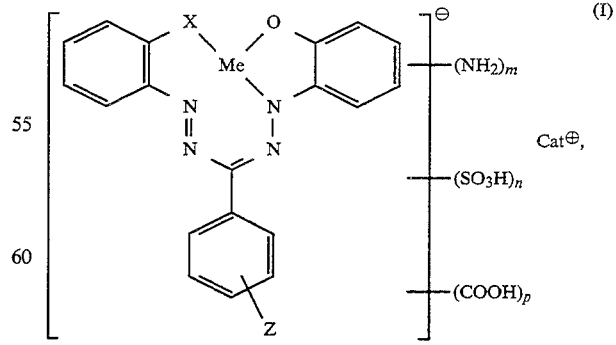
where
X is oxygen or a radical of the formula CO—O or $SO_2$—O,
Me is copper or nickel, Z is hydrogen, halogen or hydroxyl, Cat⊕ is the equivalent of a cation, m is 1 or 2, n is 1, 2, 3 or 4 and p is 0, 1 or 2, with the proviso that the sum of n+p is 1 to 4, by alkaline hydrolysis of acylated aminoformazans of the formula II

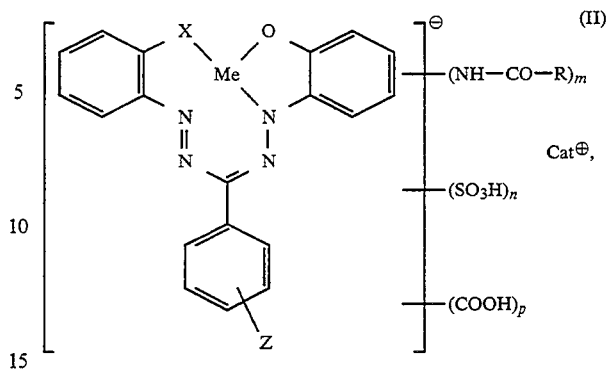

where R is hydrogen or $C_1$-$C_4$-alkyl and X, Me, Z, Cat⊕, m, n and p in each case have the abovementioned meanings, in aqueous medium, which comprises carrying out the hydrolysis at from 120° to 170° C. and at elevated pressure of from 3 to 5 bar in the presence of from 1.5 to 3 mol of an alkali metal hydroxide, based on 1 mol of acylated aminoformazan of the formula II.

2. A process as claimed in claim 1, wherein the hydrolysis is carried out at from 140° to 160° C.

3. A process as claimed in claim 1, wherein sodium or potassium hydroxide is used as the alkali metal hydroxide.

4. A process as claimed in claim 1, wherein X is the radical CO—O and Me is copper.

5. A process as claimed in claim 1, wherein R is methyl.

* * * * *